(12) United States Patent
Kohno et al.

(10) Patent No.: US 6,407,883 B2
(45) Date of Patent: *Jun. 18, 2002

(54) DISC DEVICE

(75) Inventors: Takashi Kohno, Ibaraki-ken; Kenji Tomida, Odawara, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/761,735

(22) Filed: Jan. 18, 2001

Related U.S. Application Data

(63) Continuation of application No. 09/175,328, filed on Oct. 20, 1998, now Pat. No. 6,196,224.

(30) Foreign Application Priority Data

Oct. 20, 1997 (JP) ............................................. 9-286520

(51) Int. Cl.[7] ............................................... G11B 17/02
(52) U.S. Cl. .................................. 360/99.08; 360/98.07
(58) Field of Search .......................... 360/98.07, 99.08, 360/99.04; 310/90

(56) References Cited

U.S. PATENT DOCUMENTS

| | | | | |
|---|---|---|---|---|
| 5,448,120 A | * | 9/1995 | Schaule et al. | 360/98.07 |
| 5,617,272 A | * | 4/1997 | MacLeod et al. | 360/99.08 |
| 5,619,389 A | * | 4/1997 | Dunfield et al. | 360/98.07 |
| 6,195,224 B1 | * | 2/2001 | Kohno et al. | 360/98.07 |

* cited by examiner

Primary Examiner—Robert S. Tupper
(74) Attorney, Agent, or Firm—Antonelli, Terry, Stout & KRaus, LLP

(57) ABSTRACT

A disc device includes a housing, a fixed shaft at least partially disposed in the housing, wherein the fixed shaft is divided into two parts which are joined together. The disc device also includes one or more discs, a hub for loading the discs, at least a head for reproducing information recorded on each of the discs, and a drive system for moving the head to any position on each of the discs. A motor for driving the hub to rotate is provided outside the housing, and at least two fluid film bearings are provided so that the hub is supported by the fixed shaft so as to be rotatable.

7 Claims, 6 Drawing Sheets

DISC DEVICE

CROSS REFERENCE TO RELATED APPLICATION

This is a continuation of U.S. application Ser. No. 09/175,328, filed Oct. 20, 1998, now U.S. Pat. No. 6,196,224 the subject matter of which is incorporated by reference herein.

BACKGROUND OF THE INVENTION (i) Field of the Invention

The present invention relates to a disc device aiming at a large memory capacity, particularly to a disc device with a drive system including a highly accurate bearing workable with ease.

(ii) Description of the Related Art

Ball bearings are usually used in spindle motors for information devices. Ball bearings are broadly used because of their low prices and easiness of manipulation. In a ball bearing, however, there is inevitable generation of a vibration and a noise due to a damage or a deformation on a ball or the rolling surface of the ball. Besides, the critical rotational speed is not so high.

In contrast with this, a fluid film bearing (hereinafter called FFB) can afford a far highly accurate rotation with a lower vibration by far in comparison with the ball bearing because it supports a rotating portion in a non-contact manner by an effect of a dynamic pressure generated with the rotation. The FFB therefore has a possibility to meet a high-level requirement.

As a prior art of such an FFB, Japanese Patent Unexamined Publication No. Hei 3-272318 discloses a bearing in which grooves for generating dynamic pressure are formed in a radial bearing surface opposite to a radial receiving surface of a housing and a thrust bearing surface opposite to a thrust receiving surface, and magnetic fluid seals are provided outside of two radial receiving surfaces in the axial direction.

On the other hand, Japanese Patent Unexamined Publication No. Hei 6-200939 discloses a bearing structure using a magnetic fluid as a lubricant, in which radial bearing members are provided respectively at the opening and closing portions of a housing, the end surfaces of the radial bearing members on the side of the opening portion are used as a thrust bearing, the end surfaces of the radial bearing members on the side of the closing portion are used as surfaces for preventing the radial bearing members from coming off, and members for preventing the radial bearing members from coming off are provided on the side of the thrust bearing.

In the FFB, a highly accurate rotation is possible but the bearing rigidity and the bearing load are in proportion because of a fluid dynamic pressure effect. As a result, when the bearing rigidity is increased by decreasing the gap or the width of the bearing, the bearing load increases accordingly. The bearing rigidity of the FFB is lower than that of a ball bearing having the same shaft diameter because the bearing rigidity of the FFB is generated by a dynamic pressure of a fluid. For obtaining the bearing rigidity equivalent to the ball bearing, the bearing load becomes larger 50 to 100% than that of the ball bearing.

Besides, a synthetic oil is used as the lubricating fluid in general but such a synthetic oil has a property that the viscosity varies with temperature, that is, the viscosity decreases with increase in temperature and increases with decrease in temperature. The dynamic pressure effect of a fluid is in proportion to the viscosity of the fluid. As a result, if a bearing is designed in order to ensure a sufficient bearing rigidity at a high temperature, there is a defect that the bearing load becomes very large at a low temperature. In magnetic disc devices used in a wide temperature range, the optimization of the bearing rigidity and the bearing load was a great problem in design.

Because the FFB uses a fluid for lubrication, there is another problem of the leakage of the fluid from the bearing portion. The leakage of the fluid from the bearing portion makes the reliability of the whole device lower by shortening the duration of the bearing and increasing vibrations. Besides, in a disc device, even such a very small amount of leakage as not affect on the bearing performance may cause a serious trouble if the leakage fluid adheres a disc or a head to hinder a recording or reproducing operation.

In the FFB, the performance is not satisfied unless the distance between bearings is kept very minute and highly accurate. For this reason, severe accuracy is required for processing and assembling a shaft and a bearing portion. In case of a device in which a long shaft relative to its diameter is used and a bearing is provided near an end of the shaft, it is hard to satisfy the accuracy due to a deviation of the shaft and a deformation upon assembling.

SUMMARY OF THE INVENTION

It is an object of the present invention to provide a disc device including a bearing which can be easily assembled and has a sufficient bearing rigidity.

For attaining the above object, in a disc device according to the present invention, both ends of a shaft are fixed to a housing, two bearings are provided near both ends of the shaft, and a hub on which discs are loaded is supported so as to be rotatable. A motor for driving the hub to rotate is formed outside the housing. A dust seal is provided between the motor and the housing to prevent dust from entering the housing from the exterior. The shaft is prevented from bending by fixing both ends of the shaft. Vibrations of a disc can be decreased without increasing the bearing rigidity, that is, the bearing load.

Because the motor with the greatest generation of heat is disposed outside the housing, increase in temperature of the bearing portion is restrained and so decrease in bearing rigidity due to decrease in viscosity with increase in temperature of a lubricating fluid becomes small.

A magnetic fluid is used as the lubricating fluid and permanent magnets are disposed at both axial ends of the bearing magnetically to keep the magnetic fluid in the bearing portion. The lubricating fluid is thereby completely prevented from leaking out of the bearing portion.

The above-described construction becomes difficult to assemble in case of a long shaft. In that case, the shaft is divided into two parts and the bearing and the seal portion are united. One bearing unit and one shaft are assembled and then the other bearing unit and the other shaft are assembled. After then, two shafts are joined. As a result, a disc device with good reliability against leakage of a lubricating fluid and good accuracy in assembling can be realized even in case of the device with a long shaft.

DETAILED DESCRIPTION OF THE PREFERRED EMBODIMENTS

Hereinafter, embodiments of the present invention will be described with reference to drawings.

Figure 1:
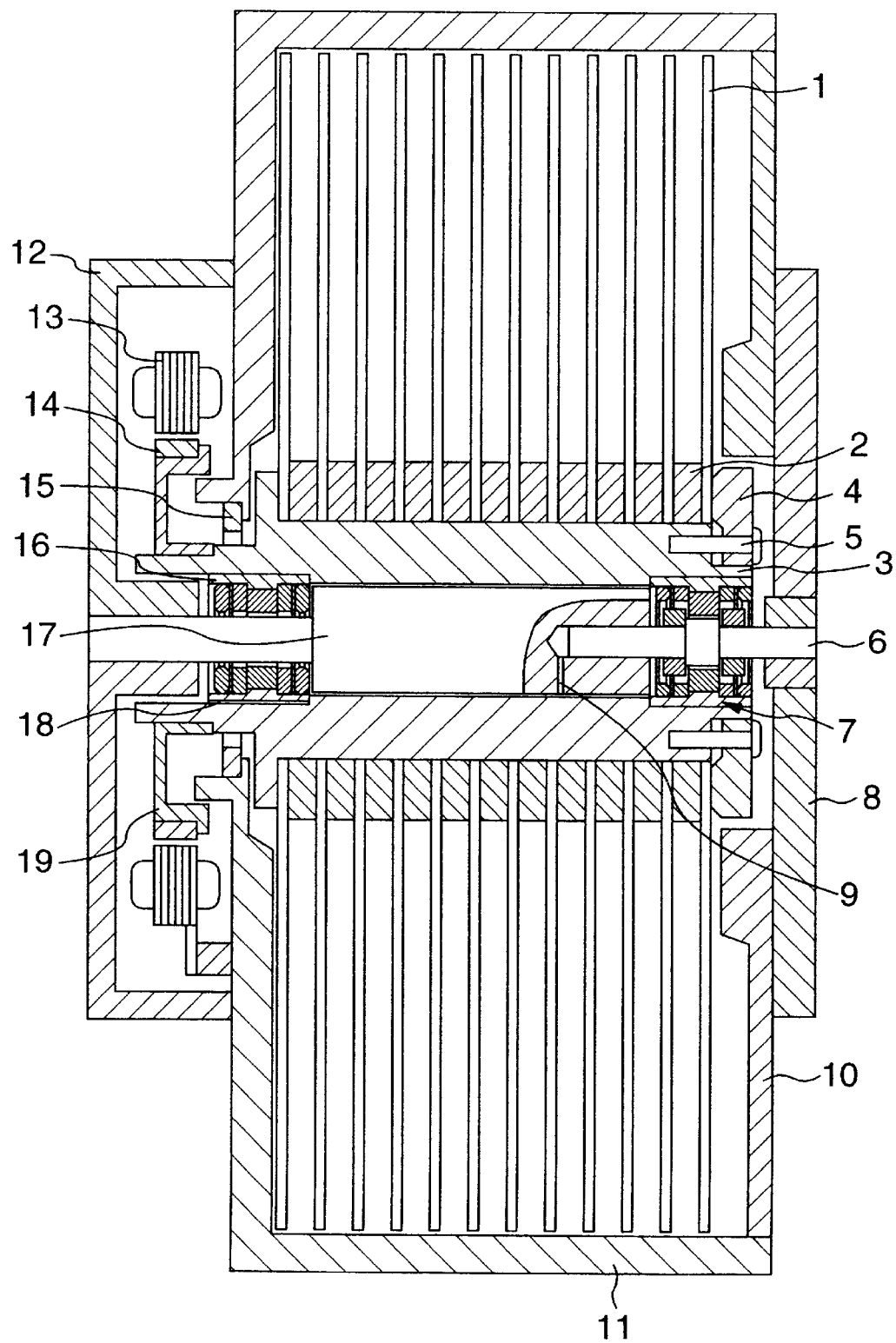
FIG. 1 is a cross-sectional view showing the first embodiment of the present invention.

FIG. 1 shows a cross section of a disc device according to the first embodiment of the present invention.

Figure 9:
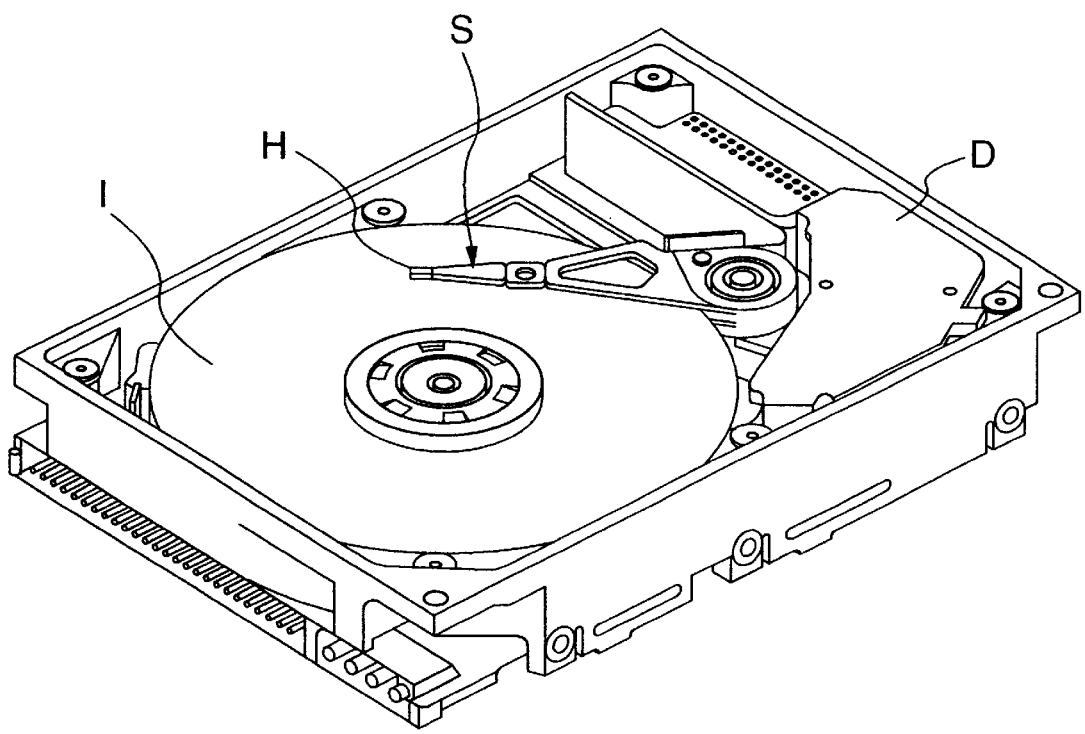
FIG. 9 is a view showing a magnetic head, a supporting mechanism for the magnetic head, a drive system and so on of a disc device.

This disc device includes a magnetic head H for reproducing information recorded on a disc, a mechanism S for supporting the magnetic head, a drive system D and so on, as shown in FIG. 9.

As shown in FIG. 1, a small diameter shaft 6 is fixed to the right side of a large diameter shaft 17 by shrinkage fit or adhesion. The small diameter shaft 6 is forcibly inserted into and fixed to a first housing cover 8- The left side portion of the large diameter shaft 17 is processed into a small-diameter portion as shown in FIG. 1. The end portion of the small-diameter portion is forcibly inserted into and fixed to a motor cover 12. The first housing cover 8 is fixed to a second housing cover 10 with not-shown screws or the like. The second housing cover 10 is fixed to a third housing cover 11 with screws or the like. The motor cover 12 is also fixed to the third housing cover 11 with screws or the like similarly. Nearly 10 sheets of magnetic discs 1 are loaded on a hub 3 at intervals with spacers 2. A large quantity of information can be stored in all by writing in magnetic information to both surfaces of each disc 1.

Those magnetic discs 1 are fixed to the hub 3 by a clamp 4. Two fluid bearings are provided respectively between the hub 3 and the small diameter shaft 6 and between the hub 3 and the small-diameter portion of the large diameter shaft 17 to support the hub 3 so as to be rotatable. The left end portion of the hub 3 extends to the outside of the third housing cover 11. A motor magnet 14 is attached to the end portion of the hub 3. A motor coil 13 surrounding the motor magnet 14 is provided on the third housing cover 11 to form a DC motor. The rotation unit comprising the hub 3 and the discs 1 can be rotated at a high speed by this motor.

Next, a process of assembling this device will be described.

First, a left bearing unit 16 is fixed to the hub 3 by any method of forcible insertion, shrinkage fit and adhesion or a method using them in combination. The small-diameter portion of the large diameter shaft 17 is inserted in the hole of the left bearing unit 16. In this state, a magnetic fluid is injected into the gap between the small-diameter portion of the large diameter shaft 17 and the left bearing unit 16. Next, the large diameter shaft 17 and the hub 3 are inserted in the opening on the left side of the third housing cover 11. A motor rotor 19 is then fixed to the left end portion of the third housing cover 11 by forcible insertion or bolts.

The motor rotor 19 is provided with the motor magnet 14 at the peripheral portion. The motor coil 13 is fixed to the third housing cover 11 with bolts or an adhesive at the position surrounding the motor magnet 14.

Next, the small-diameter portion of the large diameter shaft 17 is fixed to the hole portion of the motor cover 12 by any method of forcible insertion, shrinkage fit and adhesion. The motor cover 12 is then fixed to the third housing cover 11 by bolts, welding or the like.

As a right bearing unit 7 is inserted in the hub 3, the small diameter shaft 6 is inserted in and fixed to the large diameter shaft 17. The fixture of the right bearing unit 7 to the hub 3 and the fixture of the small diameter shaft 6 to the large diameter shaft 17 are made by forcible insertion or adhesion or a method using them in combination. Next, the discs 1 are loaded on the hub 3 with inserting a spacer 2 between each pair of them. The clamp 4 is then attached to the uppermost portion (the right side in FIG. 1) and fixed with a bolt 5. Next, the second housing cover 10 is fixed to the third housing cover 11 with bolts. Lastly, the first housing cover 8 is forcibly fitted onto or fastened with a bolt to an end portion of the small diameter shaft 61 the positional relation between the small diameter shaft 6 and the large diameter shaft 17 is adjusted, and then the first housing cover 8 is fixed to the second housing cover 10 with bolts. In this manner, the device can be assembled with ease because each part can be constructed by a piling method.

When a large number of discs 1 are rotated, a viscosity resistance is generated between the disc surfaces and the air. As a result, a large torque must be generated in order to rotate them at a high speed. It requires a large electric power to generate such a large torque, and the generation of heat in the motor becomes considerable. If the interior of the device becomes at a high temperature due to the generated heat, there arise problems that a deformation occurs due to the difference in thermal expansion between the constituent parts and the viscosity of the bearing lubricant deteriorates. In this device, however, the generated heat can be effectively discharged to the outside of the device because the motor is disposed outside the third housing cover 11. As a result, the increase in temperature in the interior of the device can be restrained and so the above problems are avoided.

Information is read out from or written in to each disc 1 through the head disposed oppositely to the corresponding surface of the disc 1. The head is floated at a very minute distance from the disc 1 by a fluid pressure attendant upon a high-speed rotation of the disc 1, and can read out information from or write in information to the disc surface opposite to the head information is stored on concentric tracks as the disc 1 is rotated. The head can be rapidly moved at any track position by a positioning mechanism, and thereby can rapidly read out information from or write in information to any track.

Because the distance between the head and the disc 1 is very minute and the disc 1 is rotated at a very high speed, the device is affected even by fine dust. In the worst case, the disc 1 or the head is damaged and stored information is destroyed. For this reason, the third housing cover 11 of this device is formed into a box shape only having an opening at the portion of the hub 3 to connect to the above motor. The third housing cover 11 thus completely envelops the discs 1, the head and the head positioning mechanism to prevent dust from coming in from the exterior. Besides, a magnetic seal 15 is provided at the position at which the third housing cover 11 is in contact with the hub 3. The magnetic seal 15 completely intercepts the circulation of air with the exterior to prevent dust from entering the third housing cover 11.

The hub 3 is supported by a pair of bearing units 7 and 16 which include fluid bearings 21 and 31 and seal portions 26 and 35 respectively.

Figure 2A:
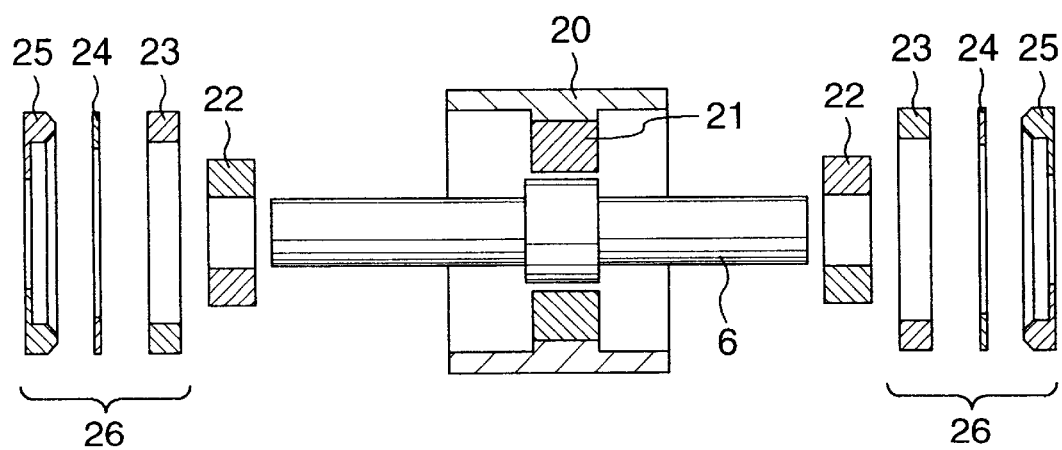
FIG. 2A is an exploded view showing parts of one bearing unit.
Figure 2B:
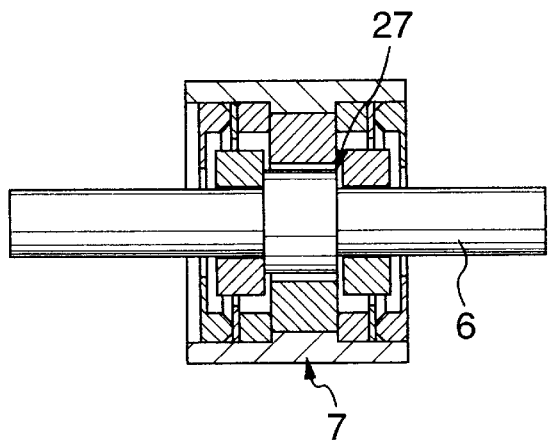
FIG. 2B is a view showing one bearing unit in the assembled state.
Figure 3A:
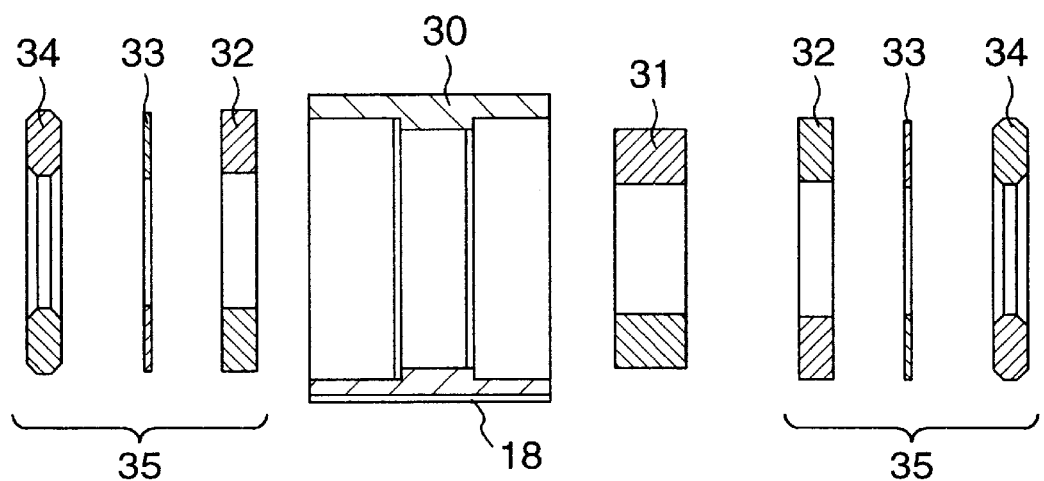
FIG. 3A is an exploded view showing parts of the other bearing unit.
Figure 3B:
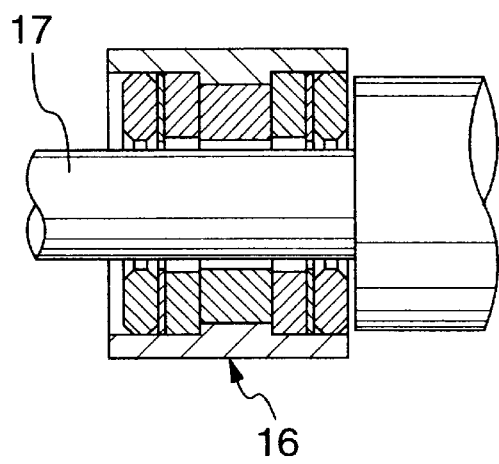
FIG. 3B is a view showing the other bearing unit in the assembled state.

FIGS. 2A and 2B show details of the construction of one bearing unit 7. FIG. 2A shows an exploded state and FIG. 2B shows the assembled state. FIGS. 3A and 3B show details of the construction of the other bearing unit 16. FIG. 3A shows an exploded state and FIG. 3B shows the assembled state.

As shown in FIGS. 2A and 2B, the bearing unit 7 is constructed in the manner that seal structures each consisting of a magnet 23, a yoke 24 made of a magnetic material and a non-magnetic cover 25 in order from the inside are symmetrically disposed at both axial ends of a bearing 21. The space defined by both yokes 24, the bearing 21 and the small diameter shaft 6 is filled with a magnetic fluid. The gap between each yoke 24 and the small diameter shaft 6 is regulated into several hundreds $\mu$m. Because the small diameter shaft 6 is made of a magnetic material, the magnetic flux from the magnet 23 is concentrated into the end portion of each yoke 24. Because the magnetic fluid has a nature that it is held along the magnetic flux, the magnetic fluid is held at the concentrated portion of the magnetic flux between each yoke 24 and the small diameter shaft 6 and not leak out even by a large centrifugal force generated upon a high-speed rotation.

As shown in FIGS. 3A and 3B, the bearing unit 16 also uses a magnetic fluid as lubricating fluid similarly to the magnetic unit 7. Seal structures each consisting of a magnet 32, a yoke 33 made of a magnetic material and a non-magnetic cover 34 in order from the inside are disposed symmetrically with respect to a bearing 31. A sufficient seal effect is thereby ensured even upon a high-speed rotation. The difference between the bearing units 7 and 16 is that the bearing unit 16 is not provided with a thrust bearing 27. This is for the following reason. In case of a motor having a large distance between two bearing units like this embodiment, if thrust bearings are formed in both of the bearing units, the distance between the thrust bearings may vary considerably because of a large difference in thermal expansion between the shaft and the hub 3.

Thrust bearings, therefore, may be formed in both of the bearing units when it is expected that there may be no difference in the rate of expansion between the shaft and the hub due to the difference in temperature or the difference in material and the distance between the thrust bearings may not vary. An axial groove is formed on the outer circumferential surface of a sleeve 30 of the bearing unit 16. This groove functions as a vent 18 to communicate the interior space defined by both bearing units 7 and 16, the large diameter shaft 17 and the hub 3 with the exterior. Because both bearing units 7 and 16 are completely sealed with the magnetic fluid as described above, the above interior space is completely closed if the vent 18 is not provided. In that case, a pressure is applied to the bearing seal portions 26 and 35 due to a difference in pressure between the interior and the exterior when the temperature or the atmospheric pressure in the exterior changes. If the pressure applied to the bearing seal portions 26 and 35 is more than the critical pressure of each seal, there is a possibility that any of the bearing seal portions 26 and 35 is broken and the magnetic fluid is scattered. In this device, however, such a difference in pressure between the interior space and the exterior is not made because the vent 18 is provided, so such a problem as described above does not arise.

This device is assembled in the manner that the small diameter shaft 6 to which the bearing unit 7 is attached is inserted in the large diameter shaft 17. This is because the bearing unit 7 is provided with the thrust bearing 27 and so thrust receiving portions 22 and the seal portions 26 must be assembled from both sides of the small diameter shaft 6. A radial hole 9 formed in the large diameter shaft 17 is for discharging air from the axial hole portion of the large diameter shaft 17 upon insertion of the small diameter shaft 6 into the axial hole portion of the large diameter shaft 17. For joining the small diameter shaft 6 with the large diameter shaft 17, a method of forcible insertion or adhesion or a method using both of them in combination can be used. In any case, if no vent for air in the axial hole portion of the large diameter shaft 17 is provided, the air of the interior of the large diameter shaft 17 is compressed as the small diameter shaft 6 is inserted. There arises a problem that a sufficient accuracy in positional relation between both shafts is not obtained due to the reaction force of the compressed air. When the vent 9 is formed in the large diameter shaft 17 for discharging air as shown in this embodiment, air is discharged from the axial hole in the large diameter shaft 17 to the exterior through the vent 9 upon insertion the small diameter shaft 6, so the accuracy in assembling does not deteriorate.

As described above, sleeves 20 and 30 of two bearing units 7 and 16 are fixed to the hub. Each of the inside surfaces of the bearings 21 and 31 has a specific shape so that a sufficient effect of dynamic pressure of the fluid is obtained between it and the shaft.

Figure 4:
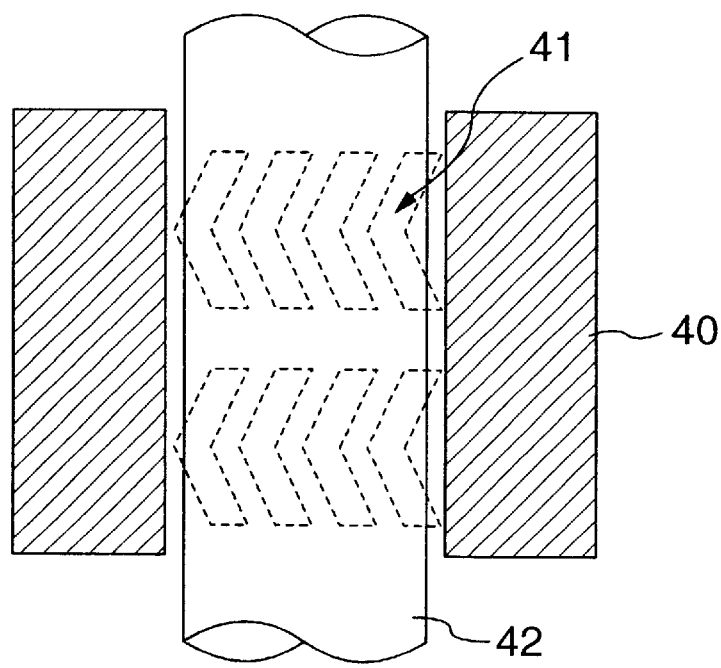
FIG. 4 is a view showing the first example of a radial bearing.

FIG. 4 shows an example of such a shape in a cross section.

In this example, a large number of grooves 41, each of which takes an inverted-V shape to the rotational direction, for generating dynamic pressure are formed in the inside surface of a bearing 40. Because a fluid is forced into the V-shaped grooves 41 for generating dynamic pressure upon rotation, a dynamic pressure effect is brought about to afford a sufficient rigidity for supporting a shaft. The dimensions of each groove 41 for generating dynamic pressure is optimized based on the relation between the necessary bearing rigidity and the allowable load. In general, the depth of each groove is about 5 $\mu$m, and the distance between shafts is about 2 to 10 $\mu$m in diameter. The dimension of V in the axial direction is not less than ½ of the shaft diameter and the dimension of V in the radial direction is about ½ of that in the axial direction. When a rotating portion is supported by a dynamic pressure bearing like this embodiment, a highly accurate rotation with few vibrations is possible even in case of a high-speed rotation because the rotating portion is supported in a non-contact manner.

Figure 5:
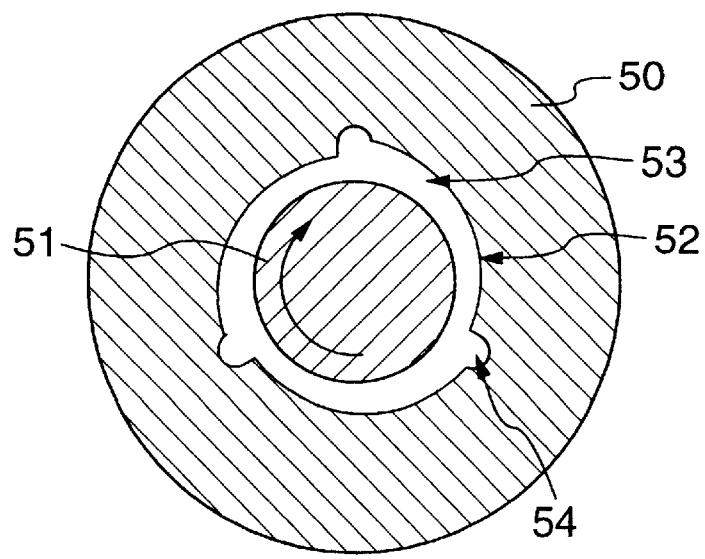
FIG. 5 is a view showing the second example of a radial bearing.

FIG. 5 shows another example of shape of the bearing.

In this example, a bearing 50 has the same cross section in an axial direction. The profile of the cross section of the bearing consists of three lobes 52. Each of the lobes 52 is formed such that the gap 53 between a shaft 51 and the bearing surface 52 becomes narrower with the rotation. In this design, a fluid is forced into narrower gap portions as the bearing 50 rotates, so a large dynamic pressure effect is obtained. An axially uniform oil groove 54 is formed at each connecting portion of the lobes 52 so that the fluid smoothly flows in each gap portion 53.

Each lobe 52 is optimized based on the relation between the necessary bearing rigidity and the allowable load. In general, the smallest distance between the shaft and the bearing is about 2 to 10 μm, and the largest distance is 2 to 5 times of the smallest distance. The length of the bearing is not less than ½ of the shaft diameter and not more than 2 times of the shaft diameter. In this bearing, the same effect of dynamic pressure bearing as the above example shown in FIG. 4 is obtained. Besides, the bearing has the same cross section in an axial direction, it can be formed by deformation processing. As a result, there is an advantage that a large number of products can be manufactured at a low cost.

The thrust bearing 27 is provided at at least one end of the bearing 21. A dynamic pressure is generated between the thrust bearing 27 and the thrust receiving portions 22 which are provided on the small diameter shaft 6 in the manner of sandwiching the bearing 21. The hub 3 is thereby supported in a thrust direction.

Figure 6:
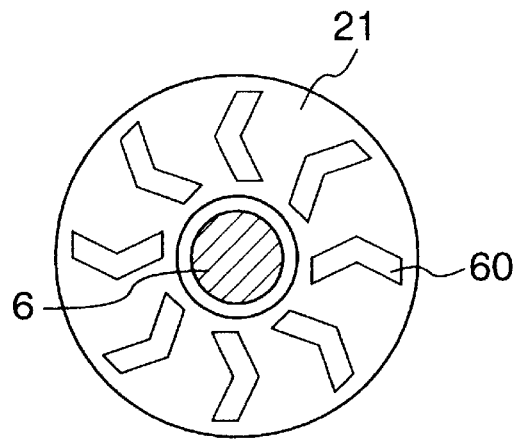
FIG. 6 is a view showing the first example of a thrust bearing.

FIG. 6 shows an example of the thrust bearing 27. A large number of grooves 60, each of which takes an inverted-V shape to the rotational direction, for generating dynamic pressure are formed in the bearing surface of the bearing 21. Because a fluid is forced into the V-shaped grooves 60 for generating dynamic pressure upon rotation, a dynamic pressure effect is brought about to afford a sufficient rigidity for supporting a shaft. A highly accurate rotation with few vibrations is possible even in case of a high-speed rotation because the rotating portion is supported in a non-contact manner.

Figure 7:
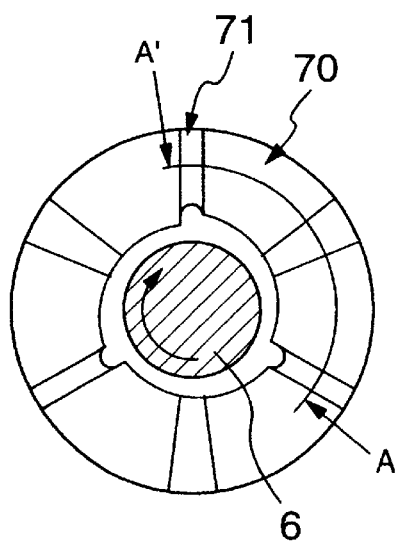
FIG. 7 is a view showing the second example of a thrust bearing.
Figure 8:
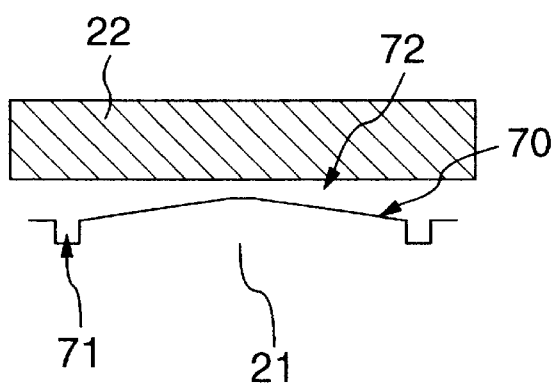
FIG. 8 is a cross-sectional view taken along line A-A' in FIG. 7 for illustrating the positional relation at that portion between opposed bearing and thrust receiving portion.

FIGS. 7 and 8 show another example of the thrust bearing 27. Three taper portions 70 are formed on the bearing 21. Each of the taper portions 70 is designed such that the gap 72 between the bearing 21 and one of the thrust receiving portions 22 becomes narrower with the rotation. By these taper portions 70, a fluid is forced into narrower gap portions as the bearing 21 rotates, so a large dynamic pressure effect is obtained. Oil grooves 71 are formed at both ends of each taper portion 70. These oil grooves 71 may communicate with the oil grooves 54 of the radial bearing, respectively. In case of this bearing structure, the same effect of dynamic pressure bearing as the above example shown in FIG. 6 is obtained. Besides, because the bearing structure is suitable for deformation processing, there is an advantage that a large number of products can be manufactured at a low cost.

The thrust bearings shown in FIGS. 6 to 8 and the above-described radial bearings shown in FIGS. 4 and 5 can be used in any combination. They never have bad influences in performance on each other.

One of problems in fluid bearing is a leakage of lubricating fluid. If such a leakage of lubricating fluid occurs, the performance of the bearing deteriorates. There is a case that information can not be recorded or reproduced normally. In the worst case, rotation may become impossible. Besides, even in case of such a very small amount of leakage or evaporation as hardly deteriorates the bearing performance, there may be a case that fluid adhering to a head or a disc 1 deteriorates the floating performance of the head. When the disc 1 is rotated at a high speed, it is very important to solve this problem of leakage in particular because the amount of leakage increases in proportion to the square of the number of rotations of centrifugal force. In this device, however, such a problem is solved by employing the above-described constructions shown in FIGS. 2A, 2B, 3A and 3B.

As described above, in a disc device according to the present invention, both ends of a shaft are fixed to a housing, two bearings are provided near both ends of the shaft, and a hub on which discs are loaded is supported so as to be rotatable. A motor for driving the hub to rotate is formed outside the housing. A dust seal is provided between the motor and the housing to prevent dust from entering the housing from the exterior. The shaft is prevented from bending by fixing both ends of the shaft. Vibrations of a disc can be decreased without increasing the bearing rigidity, that is, the bearing load. As a result, a highly dense record on the disc becomes possible.

Because the motor with the greatest generation of heat is disposed outside the housing, increase in temperature of the bearing portion is restrained and so decrease in bearing rigidity due to decrease in viscosity with increase in temperature of a lubricating fluid becomes small. As a result, the reliability of the device is improved.

A magnetic fluid is used as the lubricating fluid and permanent magnets are disposed at both axial ends of the bearing magnetically to keep the magnetic fluid in the bearing portion. The lubricating fluid is thereby completely prevented from leaking out of the bearing portion so the reliability of the device is improved.

The above-described construction becomes difficult to assemble in case of a long shaft. In that case, the shaft is divided into two parts and the bearing and the seal portion are united. One bearing unit and one shaft are assembled and then the other bearing unit and the other shaft are assembled. After then, two shafts are joined. As a result, even in case of a device with a long shaft, leakage of a lubricating fluid is prevented and so a disc device with good reliability and good accuracy in assembling can be realized.

What is claimed is:

1. A disc device comprising a housing, a fixed shaft at least partially disposed in said housing, said fixed shaft being divided into two parts which are joined together, said two parts of said fixed shaft being at least partially disposed in said housing, one or more discs disposed in said housing, a hub disposed in said housing for loading said discs, at least a head at least partially disposed in said housing for reproducing information recorded on each of said discs, and a drive system at least partially disposed in said housing for moving said head to any position on each of said discs, wherein a motor for driving said hub to rotate is provided outside said housing, and at least two fluid film bearings at least partially disposed in said housing are provided so that said hub is supported by said fixed shaft so as to be rotatable.

2. A disc device according to claim 1, wherein two seals for preventing fluid from leaking are provided at both axial ends of each of said fluid film bearings so as to sandwich each of said fluid film bearings.

3. A disc device according to claim 1, wherein a dust seal is provided between said housing and said hub.

4. A disc device according to claim 2, wherein a magnetic fluid is used as a lubricating fluid for said fluid film bearings, and a magnetic seal in which permanent magnets are used or permanent magnets and yokes made of a magnetic material are used in combination is used as each of said seals for preventing fluid from leaking.

5. A disc device according to claim 1, wherein at least one of the at least two fluid film bearings is provided for one of the two parts of said fixed shaft and at least another of the at least two fluid film bearings is provided for another of the two parts of said fixed shaft.

6. A disc device according to claim 1, wherein said two parts of said fixed shaft are two shafts which differ in diameter from each other.

7. A disc device comprising a housing, a fixed shaft at least partially disposed in said housing, one or more discs, a hub for loading said discs disposed in said housing at least partially disposed in said housing, a hub for loading said discs disposed in said housing, at least a head for reproducing information recorded on each of said discs, and a drive system at least partially disposed in said housing for moving said head to any position on each of said discs, wherein two shafts which differ in diameter from each other are joined with each other to form said fixed shaft, a motor for driving said hub to rotate is provided outside said housing, and said two shafts are respectively provided with fluid film bearings at least partially disposed in said housing so that said hub is supported by said fixed shaft so as to be rotatable.

* * * * *

UNITED STATES PATENT AND TRADEMARK OFFICE
CERTIFICATE OF CORRECTION

PATENT NO.    : 6,407,883 B2       Page 1 of 1
DATED         : June 18, 2002
INVENTOR(S)   : Kohno et al.

It is certified that error appears in the above-identified patent and that said Letters Patent is hereby corrected as shown below:

<u>Title page,</u>
Item [63], should read: -- [63] Continuation of application No. 09/175,328, filed on October 20, 1998, now U.S. Patent No. 6,195,224 --

Signed and Sealed this

Seventeenth Day of December, 2002

JAMES E. ROGAN
*Director of the United States Patent and Trademark Office*